(12) United States Patent
Fischer et al.

(10) Patent No.: US 7,791,714 B2
(45) Date of Patent: Sep. 7, 2010

(54) DEVICE AND METHOD FOR RECORDING DISTANCE-MEASURING IMAGES

(75) Inventors: Marc Fischer, Nonnenhorn (DE); Ludwig Listl, München (DE); Peter Mengel, Eichenau (DE)

(73) Assignee: Siemens Aktiengesellschaft, Munich (DE)

( * ) Notice: Subject to any disclaimer, the term of this patent is extended or adjusted under 35 U.S.C. 154(b) by 306 days.

(21) Appl. No.: 11/991,981

(22) PCT Filed: Sep. 28, 2006

(86) PCT No.: PCT/EP2006/066855
§ 371 (c)(1),
(2), (4) Date: Mar. 13, 2008

(87) PCT Pub. No.: WO2007/036557
PCT Pub. Date: Apr. 5, 2007

(65) Prior Publication Data
US 2009/0135405 A1    May 28, 2009

(30) Foreign Application Priority Data
Sep. 30, 2005    (DE) .................. 10 2005 046 950

(51) Int. Cl.
*G01C 3/08* (2006.01)
(52) U.S. Cl. .................. 356/5.03; 356/5.01; 356/5.1; 356/5.15
(58) Field of Classification Search .................. 356/5.03
See application file for complete search history.

(56) References Cited

U.S. PATENT DOCUMENTS

| 4,722,599 A | 2/1988 | Fruengel et al. |
| 4,850,692 A * | 7/1989 | Hirao et al. ................. 356/3.04 |
| 6,373,557 B1 * | 4/2002 | Mengel et al. ............. 356/4.07 |
| 2004/0189984 A1 * | 9/2004 | Burgshcat et al. ...... 356/139.03 |

FOREIGN PATENT DOCUMENTS

| DE | 19833207 A1 | 2/2000 |
| WO | WO 03016944 A2 | 2/2003 |

OTHER PUBLICATIONS

P. Mengel, G. Doemens and L. Listl, "Fast range imaging by CMOS sensor array through multiple double short time integration (MDSI)", Proceedings 2001 International Conference on Image Processing. ICIP 2001. Thessaloniki, Greece, Oct. 7-10, 2001, International Conference on Image Processing, New York, NY: IEEE, US, vol. 1, Conf. 8, pp. 169-172.

"Fast range imaging by CMOS sensor array through multiple double short time integration (MDSI)", Proceedings 2001 International Conference on Image Processing.ICIP 2001. Thessaloniki, Greece, Oct. 7-10, 2001, International Conference on Image Processing, New York, NY: IEEE, US, vol. 1, Conf. 8, pp. 169-172; Others.

\* cited by examiner

Primary Examiner—Thomas H Tarcza
Assistant Examiner—Luke D Ratcliffe

(57) ABSTRACT

A recording device for distance images becomes multi-target-enabled by means of the arrival of light pulses reflected at object regions at different distances being temporally resolved. This is done using extrema of the gradient of a correlation function between the received light pulses and a time window during which sensor elements of a camera are activated.

15 Claims, 7 Drawing Sheets

DEVICE AND METHOD FOR RECORDING DISTANCE-MEASURING IMAGES

CROSS REFERENCE TO RELATED APPLICATIONS

This application is the US National Stage of International Application No. PCT/EP2006/066855, filed Sep. 28, 2006 and claims the benefit thereof. The International Application claims the benefits of German application No. 10 2005 046 950.7 DE filed Sep. 30, 2005, both of the applications are incorporated by reference herein in their entirety.

FIELD OF INVENTION

The invention relates to a device for recording distance-measuring images, comprising a light source which emits light pulses and a photodetector which integrates the light stream of a light pulse, reflected on an object region, via a time window whose time interval can be varied in relation to the process of emission of a light pulse, into a multiplicity of light quantity values, and comprising an evaluation unit connected downstream of the photodetector, which evaluation unit determines, on the basis of the correlation function formed by the light quantity values, the distance of the object region.

The invention also relates to a method for recording distance-measuring images, in which, with the aid of a light-propagation-time-measuring device with short-term integration, a correlation function is determined between a light pulse reflected on an object region and a time window of the light-propagation-time-measuring device.

BACKGROUND OF INVENTION

Such a device and such a method are known from WO 03/016944 A2. In the case of the known device and the known method, light pulses are transmitted from a light source to an object surface and reflected there. The light reflected on the object surface goes to an image converter manufactured using CMOS technology, which image converter has a multiplicity of photodetectors in which the incident light stream can generate charge carriers when the photodetector is activated. The photodetectors can be activated for a variable time window. The quantity of charge present in the photodetector at the end of the time window is a measure of the light quantity which has been detected by the photodetector during the time window. By means of the photodetector, the incident light stream is therefore integrated during the time window.

By varying the time interval between the process of emission of the light pulse and the time window used for integration, a correlation function between the light pulse and the time window can be determined. If the duration of the light pulses is equal to the duration of the time window, the correlation function has a pronounced maximum. The maximum of the correlation function lies at a time value which corresponds to the light propagation time of the light pulse from the light source to the photodetector. The light propagation time can therefore be determined directly from the maximum of the correlation function. The distance between object surface and device can then be calculated from the light propagation time.

The known device and the known method can be used in the fields of automotive engineering, navigation or building engineering, safety engineering and automation.

One disadvantage of the known device and of the known method is that objects lying partially concealed, for example on a vehicle behind a fence or a bush, are not recognized correctly. Likewise, dust or other contamination on the optical system can lead to incorrect measurements. In the known method and the known device, an average distance value is displayed for objects lying partially concealed, said average distance value being produced from the averaging of various distance values.

SUMMARY OF INVENTION

Taking this prior art as a starting point, an object underlying the invention is therefore to create a device and a method for recording distance-measuring images which are multi-target-capable.

This object is achieved by a device and a method having the features of the independent claims. Advantageous embodiments and further developments are indicated in the claims dependent thereon.

In the device and the method, extreme values of the gradient are determined in the correlation function and from these the distances of differently distant object regions are determined. This is because light pulses which are reflected on differently distant object regions, arrive at the respective photodetector in a delayed manner. They therefore contribute to the light quantity signal only if the respective light pulse lies within the time window used in each case. A stepped rise in the correlation function can therefore be attributed to the detection of additional light pulses. The light propagation time of the light pulses reflected on different object regions can then be determined from the gradient maxima. The device and the method are to this extent multi-target-capable.

In a preferred embodiment, the duration of the light pulses emitted by the light source is chosen so as to be less than or equal to the light propagation time for a distance difference to be resolved. The duration of the light pulses is to be understood here to be the half-amplitude duration of the light pulses. With light pulses of this duration it is possible to resolve the required distance interval.

Furthermore, the gradient maxima are preferably determined on the basis of a derivation function of the correlation function. In this case, the determination of the gradient maxima can be traced to a search for local extreme values.

The gradient function is preferably determined by determining the difference between two light quantity values which have a time interval in the range of the pulse duration. This reduces susceptibility to interferences and noises typical in the computation of a derivation function.

The light quantity values recorded by a photodetector can be temporarily stored in an intermediate memory. The computation of the derivation can then be carried out on the basis of the light quantity values stored in the intermediate memory. In such an embodiment, all the photodetectors can be directed at different object regions and thereby contribute to full spatial resolution.

In a further modified embodiment, two adjacent photodetectors are respectively operated with offset time windows and the difference value read out in each case. This embodiment offers the advantage that the variation of the light pulses has no influence on the difference signal. Also, the reset noise typical of photodetectors manufactured using CMOS technology is largely eliminated.

In a further preferred embodiment, the additional locational information is used to enhance the spatial resolution of the distance-measuring image. With unknown objects, the distance values of adjacent image elements of the distance-measuring image can be used for this purpose, different distance values being assigned to partial regions of an image element according to the distance values of the adjacent image elements.

With known objects, the distance-measuring image can be generated through adaptation to the known object. This is particularly advantageous in the case of monitoring tasks, where the aim is to detect moving known objects and the objects to be detected are partially concealed by other structures.

BRIEF DESCRIPTION OF THE DRAWINGS

Further advantages and characteristics of the invention will emerge from the description below in which exemplary embodiments of the invention will be explained in detail with reference to the attached drawings, in which.

DETAILED DESCRIPTION OF INVENTION

Figure 1:
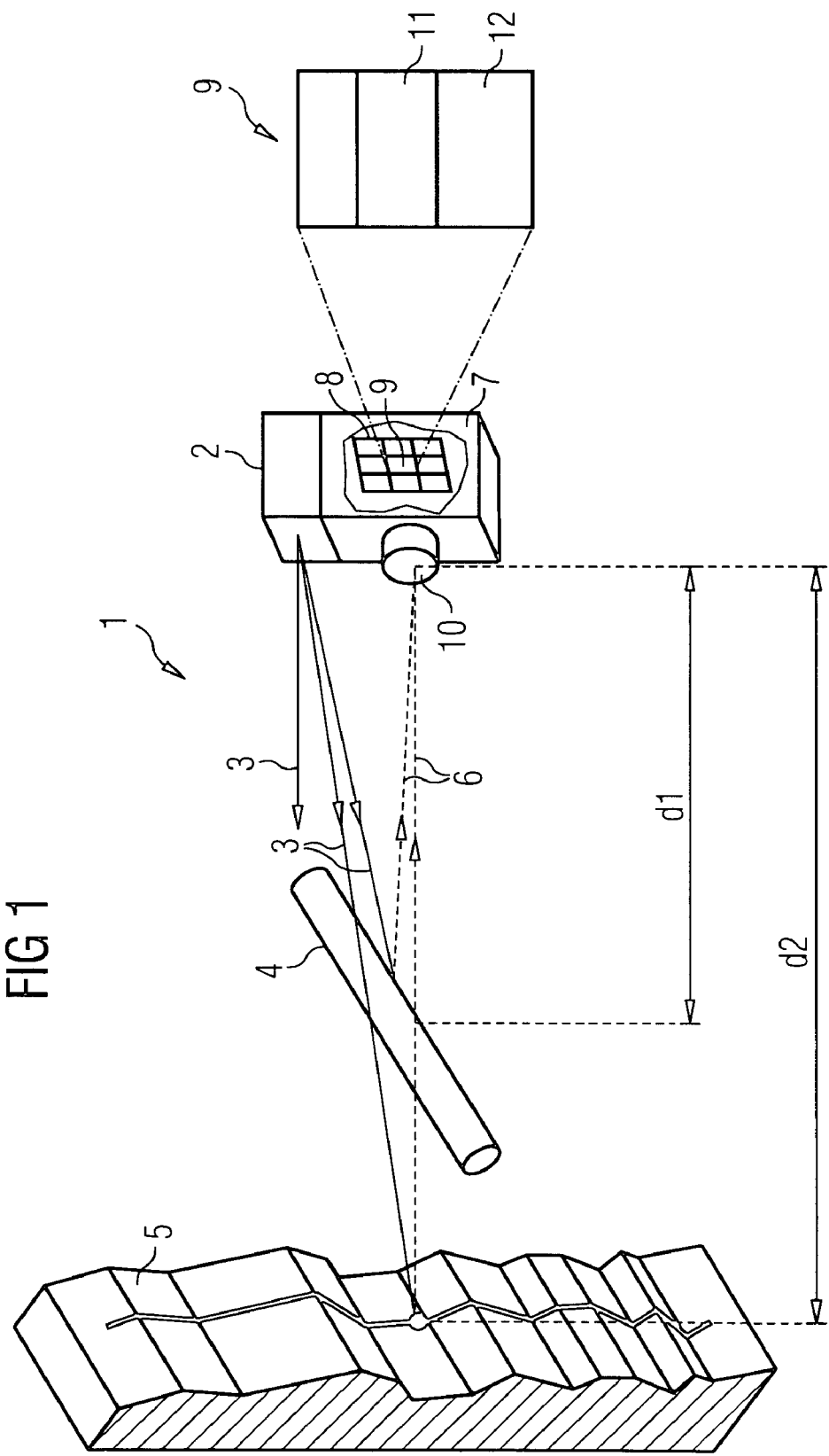
FIG. 1 shows a view of a device for generating distance-measuring images.

FIG. 1 shows a recording device 1 for distance-measuring images. The recording device 1 comprises a laser light source 2 which transmits light pulses 3 onto a foreground object 4 and a background object 5. The light pulses 6 reflected by the foreground object 4 and by the background object 5 are detected by a camera 7 which comprises a light sensor 8, manufactured using CMOS technology, comprising a multiplicity of sensor elements 9.

It should be noted that the reflected light pulses 6 may be both reflected and scattered back.

The foreground object 4 is located at the distance d1 from the camera 7, while the background object 5 is located at a distance d2 from the camera. Through an optical system 10 of the camera 7, the foreground object 4 and the background object 5 are mapped onto the sensor elements 9. Due to the low spatial resolution of the light sensor 8, an image of the foreground object 4 covers only a partial area of the sensor element 9. The rest of the sensor element 9 is occupied by an image 12 of the background element 5. The sensor element 9 concerned therefore receives both light pulses which have been reflected by the foreground object 4 and light pulses which have been reflected by the background object 5. Light pulses 6 therefore arrive in a sensor element 9 concerned, delayed by different lengths of time.

Figure 2:
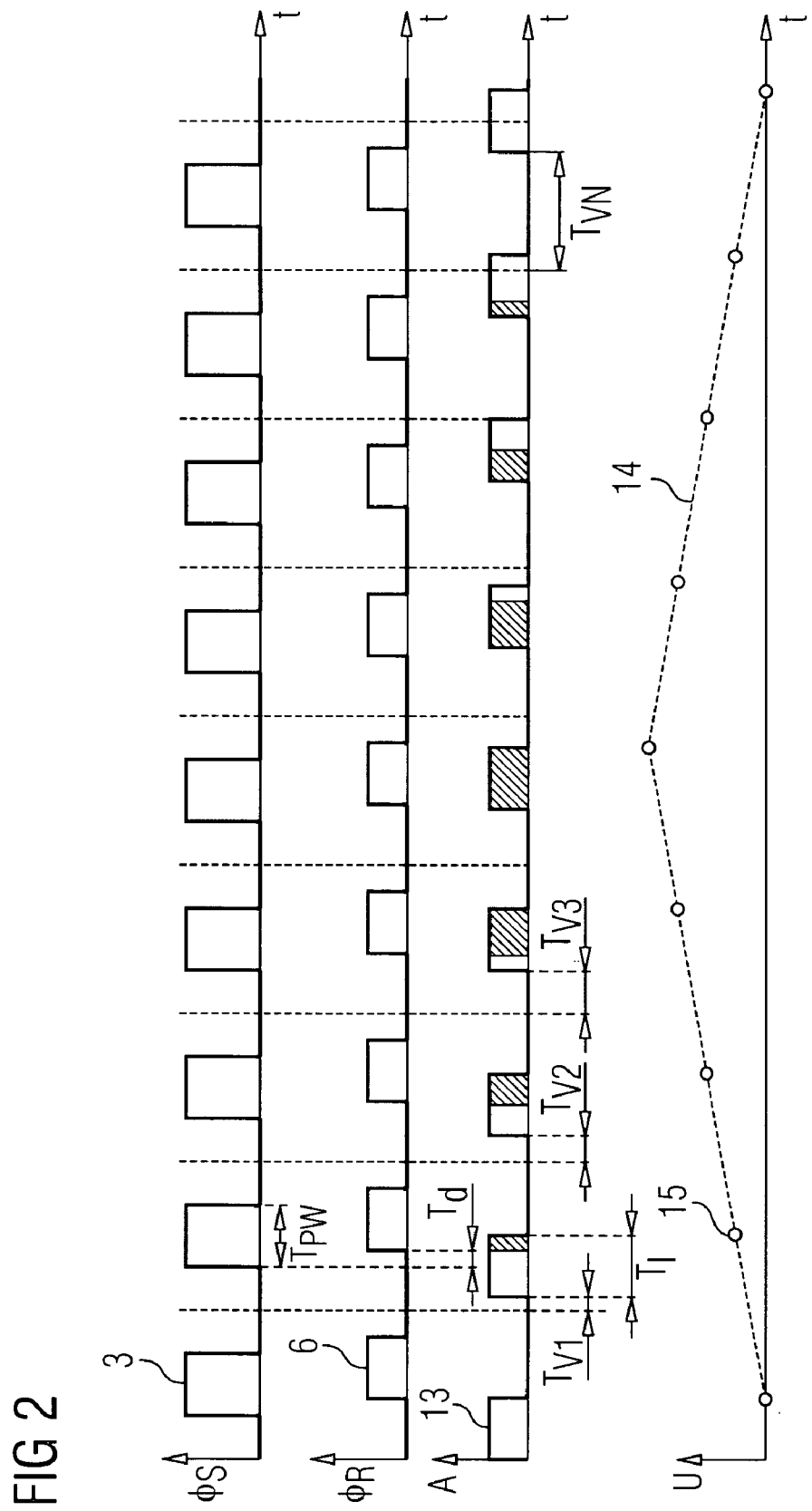
FIG. 2 shows timing diagrams of the light pulses, the time windows used for integration and the reflected light pulses, including the portions detected by the sensor, and a representation of a correlation function.

FIG. 2 represents in timing diagrams a sequence of light pulses 3 emitted by the laser light source 2, of reflected light pulses 6 and a sequence of integration windows 13, as well as a correlation function 14 emerging from the measurement.

In the timing diagram containing the light pulses 3, the light streams $\Phi_S$ are shown. In the timing diagram containing the reflected light pulses 6, the light streams $\Phi_R$ of the reflected light pulses 6 are shown. The reflected light pulses 6 are delayed by a time span $T_d$ according to the time needed for the path to the object and back to the camera 7.

The sensor elements 9 are activated for the duration of the integration windows 13. The integration windows 13 have a time duration $T_1$ and are each offset in the individual measurement processes by a time span $T_{V0}$ to $T_{VN}$. Integration of the light stream of the reflected light pulse 6 takes place only within the integration window 13. The light quantity Q of the reflected light pulses 6 which strikes the respective sensor element 9 in the integration window 13 is determined. The light quantity values 15 are proportional to the quantity of charge or voltage U read out from the sensor elements. The light quantity values 15 determined in this manner form a correlation curve 14. Since the light quantity value 15 is at its maximum when the reflected light pulse 6 falls fully within the integration window 13, the propagation-time-dependent delay $T_d$ of the light pulse can be determined, for example, from the maximum of the correlation curve 14. A prerequisite for this, however, is that the integration duration $T_1$ of the integration window 13 is approximately equal to the pulse duration $T_{PW}$ of the light pulse 3.

Figure 3:
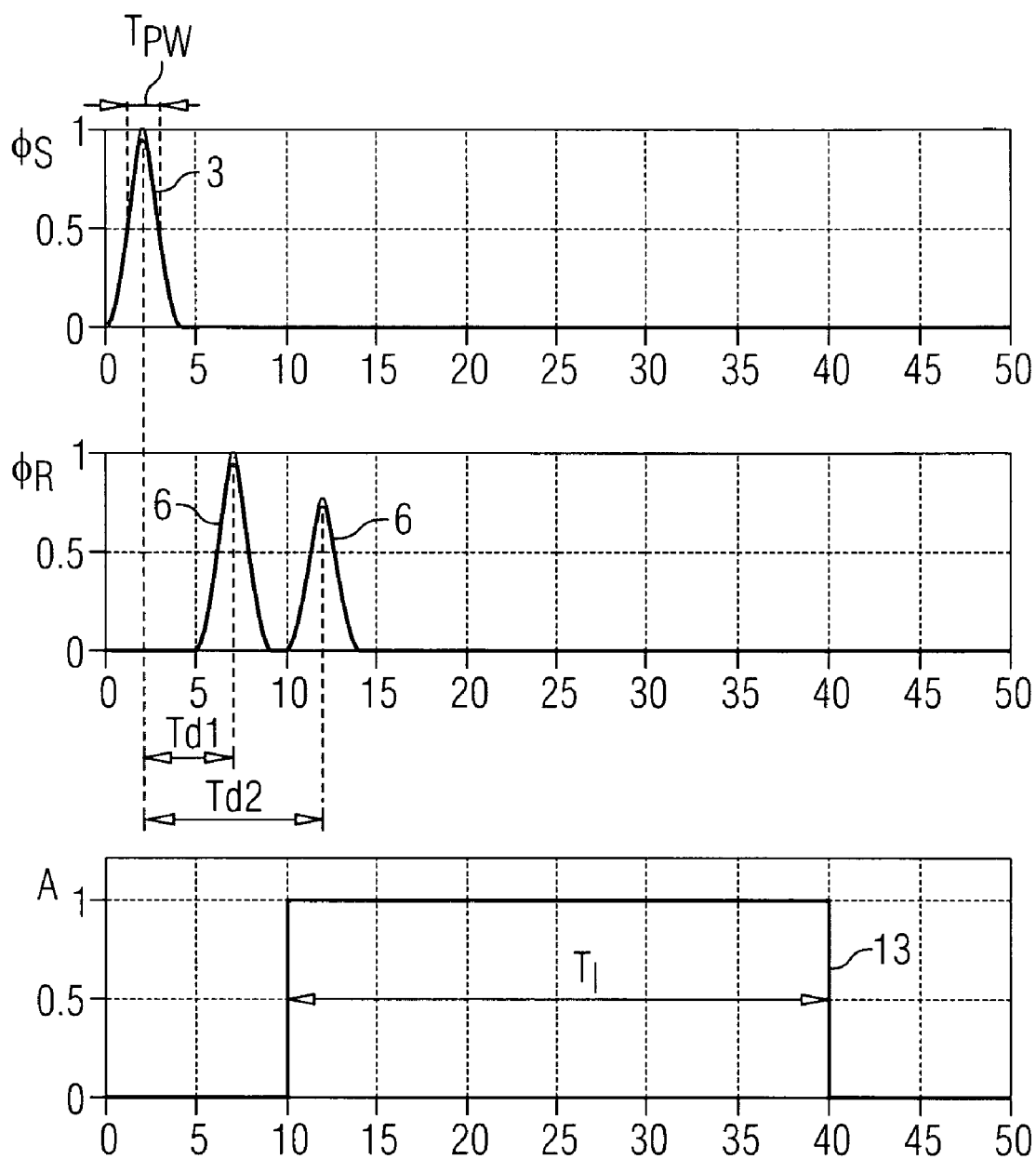
FIG. 3 shows timing diagrams with the emitted light pulse, two reflected light pulses and an integration window which captures one of the two reflected light pulses.

FIG. 3 now represents the situation in which the emitted light pulse 3 is reflected firstly on the foreground object 4 and secondly on the background object 5. Two time-shifted light pulses 6 therefore strike the sensor element 9. In FIG. 3, only the second light pulse 6, which has been reflected on the background object 5, is captured, as the sensor element 9 concerned is activated at the time of arrival of the light pulse 6 reflected on the background object 5. The timing diagrams shown in FIG. 3 relate to the delay time $T_{V5}$.

Figure 4:
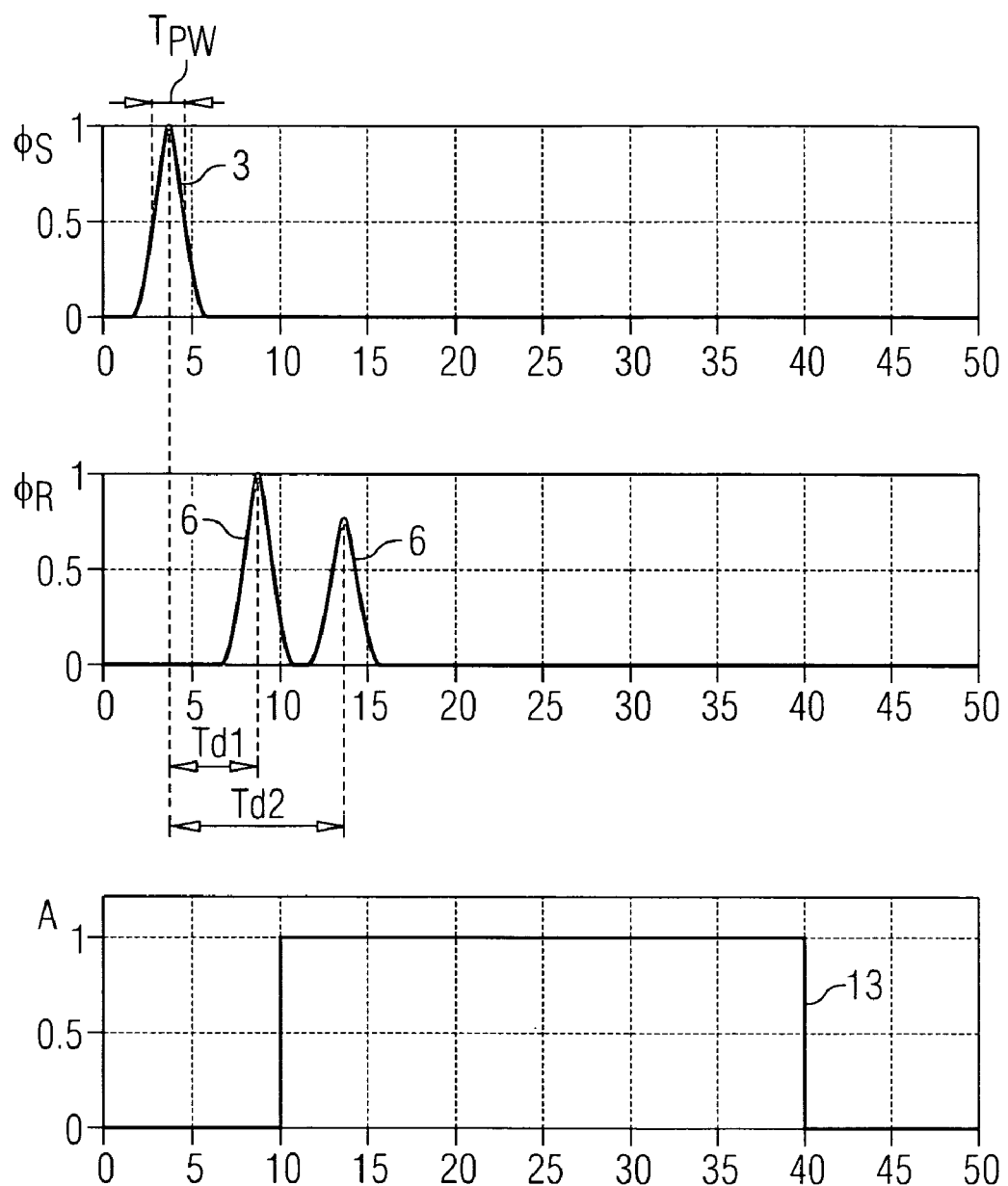
FIG. 4 shows timing diagrams as shown in FIG. 3, in which the integration window captures the second reflected light pulse at least partially.

In FIG. 4, the situation is represented where the delay period is $T_{V7}$. In this case, the time interval between the emitted light pulse 3 and the integration window 13 has been shortened further. As a consequence, the integration window captures not only the light pulse 6 reflected on the background object 5, but at least in part also the light pulse 6 reflected on the foreground object 4.

Figure 5:
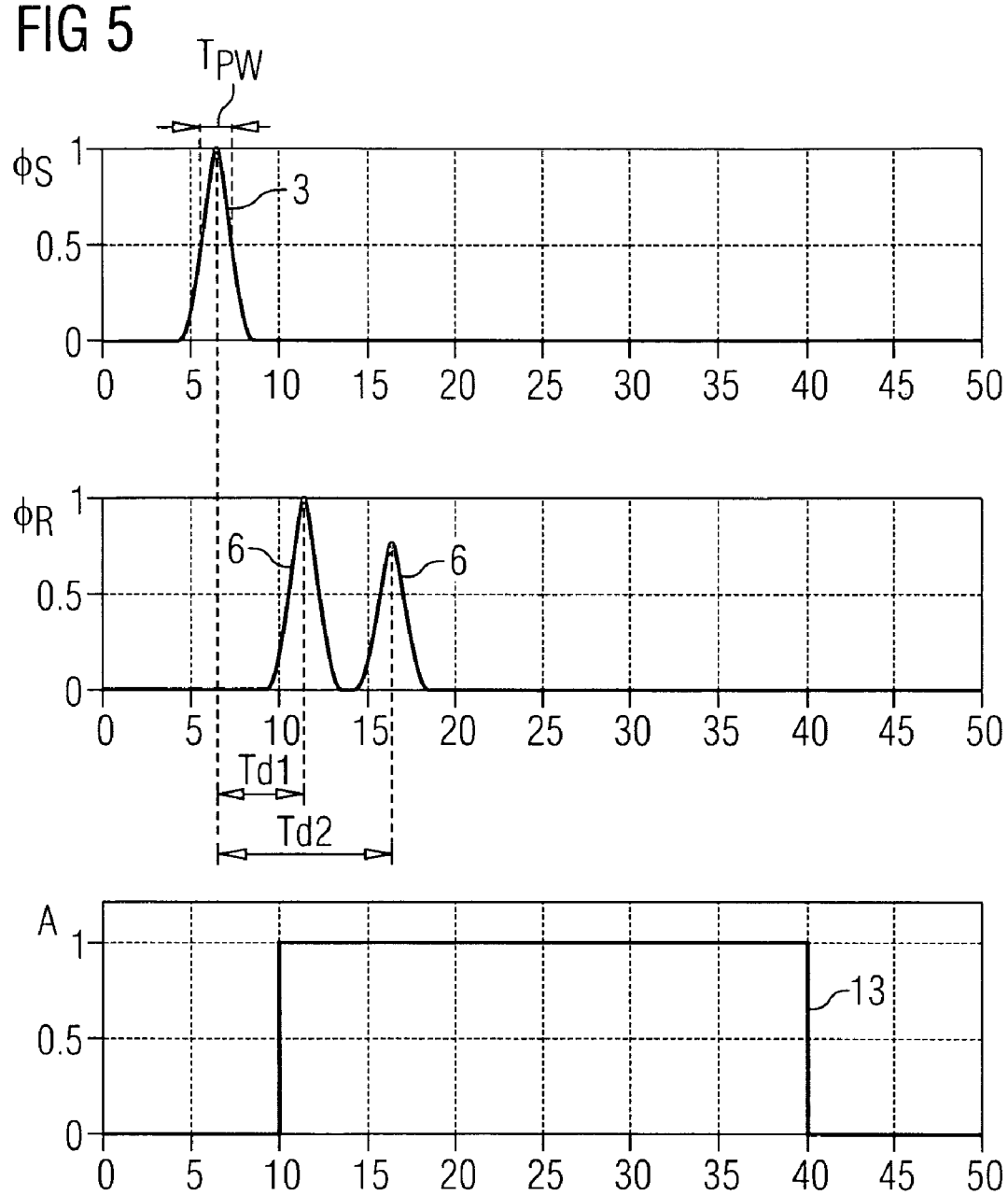
FIG. 5 shows timing diagrams as shown in FIG. 3, in which the integration window captures both light pulses.

FIG. 5 represents the conditions where the delay time is $T_{V9}$. The time interval between the emitted light pulse 3 and the integration window 13 is now so small that both reflected light pulses 6 lie within the integration window 13 and are captured.

Figure 6:
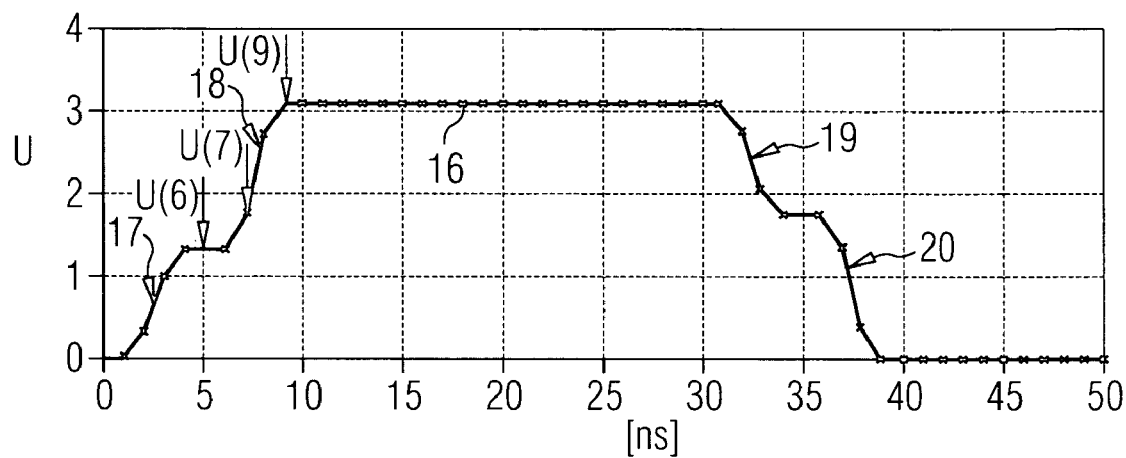
FIG. 6 shows a representation of a correlation function where two reflected light pulses are present.

FIG. 6 shows the correlation curve 16 which is produced by resolving the individual reflected light pulses 6. At the rising end, the correlation curve 16 has a step 17 between 0 and the delay time $T_{V5}$ and a further step 18 between the delay time $T_{V5}$ and the delay time $T_{V9}$. At the falling end, the correlation curve 16 has falling steps 19 and 20 corresponding to the rising steps 17 and 18. By detecting the inversive points of steps 17 and 18 and also of 19 and 20, the light propagation time of the light pulses 6 reflected on the foreground object 4 and background object 5 can be determined.

The correlation curve 16 represented in FIG. 6 was recorded on the basis of a multiple scene comprising a foreground object 4 and background object 5, which were at a distance of 150 cm from one another, with a pulse width $T_{PW}$ of 2 ns and an integration time $T_1$ of 30 ns.

With a pulse width of 0.1 ns, distance differences of as little as around 1.5 cm can be resolved.

Figure 7:
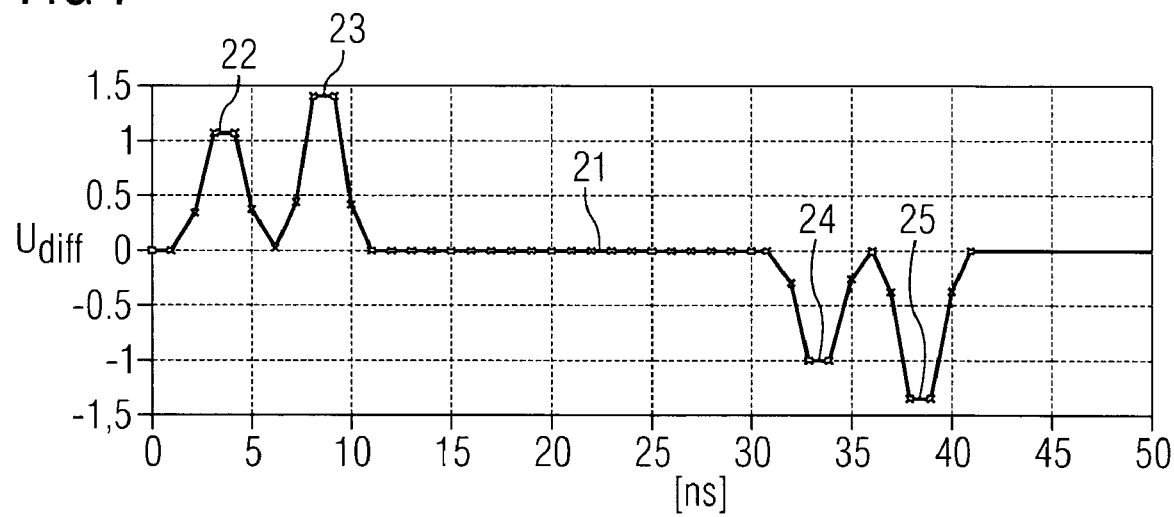
FIG. 7 shows the derivation of the correlation function from FIG. 6.

Determination of the inversive points is advantageously carried out on the basis of a difference curve 21, represented in FIG. 7, in which the inversive points become local extreme values which can be determined more simply and reliably than the inversive points of the correlation curve 16. In the difference curve 21 as per FIG. 7, the rising steps 17 and 18 are each associated with local maxima 22 and 23, while the falling steps 19 and 20 in the differential curve 21 correspond to a minimum 24 and 25 respectively. The number and distance of the extreme values of the differential curve 21 determine the number of and the distance of the different object layers.

The difference curve 21 is advantageously formed by computing the difference of a defined value of the correlation curve with a value of the correlation curve 16 shifted by a time interval $\Delta t$. For the value of the difference curve 21, $U_{DIFF}=U(t)-U(t-\Delta t)$ then applies, where the time interval $\Delta t$ is advantageously chosen so as to be equal to the pulse width $T_{PW}$. This reduces the susceptibility to signal interference and signal noise typical when computing the difference curve 21.

Figure 8:
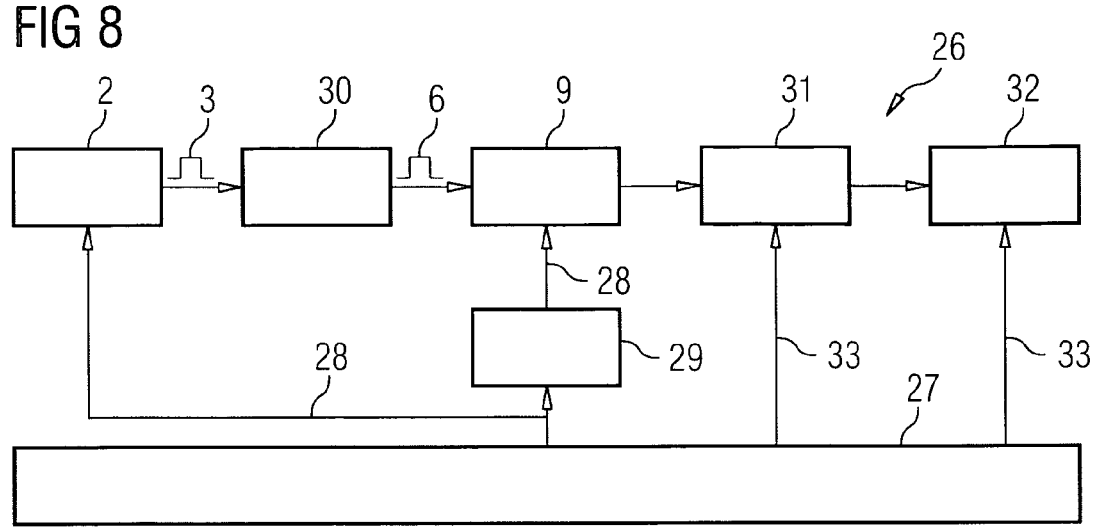
FIG. 8 shows a block diagram of a device for recording distance-measuring images.

FIG. 8 shows a block diagram of a circuit 26 provided for operating the recording device 1 from FIG. 1. The circuit 26 comprises a control unit 27 which sends a trigger signal 28 to the laser light source 2. The trigger signal 28 is also sent by a delay unit 29 and controls the light sensor 8. The rising edge of the trigger signal 28 can be used, for example, to trigger in the laser light source 2 a light pulse 3 which is emitted to a scene 30 to be investigated, is reflected there and arrives at the light sensor 8 as a reflected light pulse 6. While the trigger signal 28 occupies a high level, the light sensor 8 remains activated. The quantity of charge generated in the individual sensor elements 9 is read out, digitalized and stored in an intermediate memory 31. An evaluation unit 32 connected downstream of the intermediate memory 31 then computes on the basis of the correlation curve 16 stored in the intermediate memory 31 the difference curve 21. From the difference curve 21 the evaluation unit 32 can then determine the number and distance of the image layers.

In accordance with FIG. 8, the intermediate memory 31 and the evaluation unit 32 also receive control signals 33 from the control unit 27.

Figure 9:
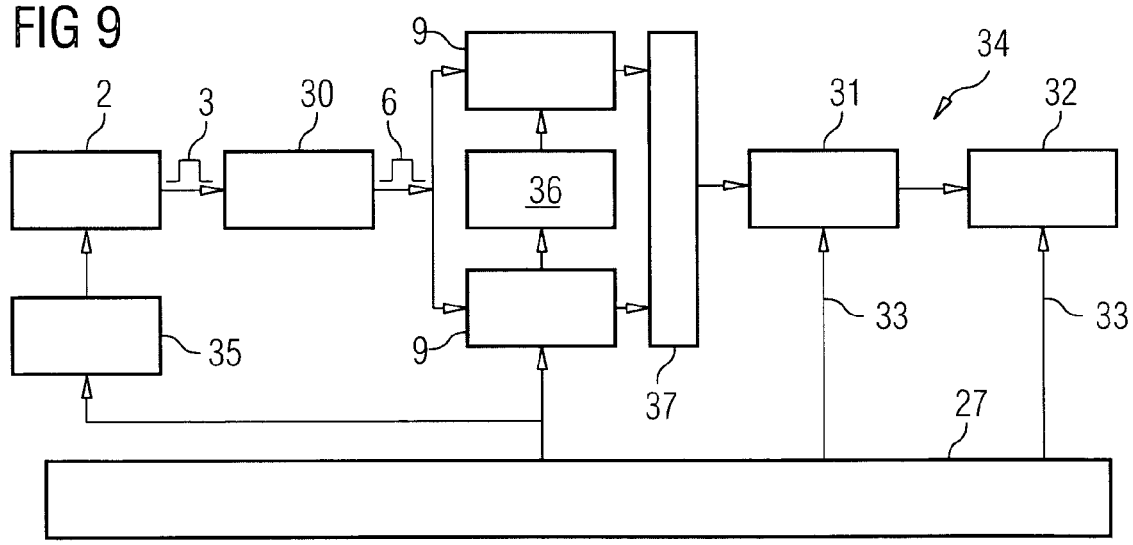
FIG. 9 shows a block diagram of a further device for recording distance-measuring images.

FIG. 9 shows a block diagram of a further circuit 34 which can be used for the recording device 1.

The trigger signal 28 generated by the control unit 27 of the circuit 34 is routed in the circuit 34 on the path to the laser light source 2 via a delay unit 35. This is readily possible, since what ultimately counts is only that the time interval between the emission of the light pulses 3 by the laser light source 2 and the integration window 13 can be varied. The trigger signal 28 is received by the sensor elements 9, pairs of adjacent sensor elements 9 operating with time-shifted integration windows 13 due to a delaying of the trigger signal 28 in a delay unit 36. Consequently, as soon as the sensor elements 9 are triggered, it is possible to compute the values of the difference curve 21 in a difference-forming unit 37 and to store these in the intermediate memory 31. The evaluation unit 32 can then determine the number and distance of the object layers on the basis of the position and the number of the local extreme values.

Through parallel capture in the sensor elements 9, the same light pulse 6 is always integrated in both integration windows 13. This increases the measurement accuracy since the reset noise typical of light sensors 8 manufactured using CMOS technology is largely eliminated. In addition, the variation in the pulse duration $T_{PW}$ of the light pulses 3 has no influence on the values of the difference curve 21.

It should be pointed out that the recording device 1 is also capable of detecting contamination and moisture on the optical equipment. To this end, a protective glass cover is advantageously mounted in front of the laser light source 2 and the camera 7, through which protective glass cover both the light of the emitted light pulses 3 and the light pulses 6 reflected by the scene 30 pass. Dirt or moisture on the outside of the protective glass cover lead to part of the emitted light pulse 3 being reflected in the direction of the camera 7. The other part of the emitted light pulse, however, goes to the scene 30 and is reflected by the scene 30. The successively arriving light pulses 6 can be detected on the basis of the correlation curve 16. In this way it is possible to respond early to contamination or wetting of the optical equipment, for example by activating a cleaning device. Such a cleaning device may, for example, be a windscreen wiper or a blowing device, by means of which the function of the recording device 1 can be maintained even under adverse environmental conditions.

By means of the recording device 1, it is also possible to achieve a lateral spatial resolution that is not restricted by the lateral extension of the sensor elements 9. Normally, structures of the scene 30 to be investigated whose representation on the light sensor 8 falls below the size of a sensor element 9 cannot be detected. However, by resolving the distance based on the basis of the multi-target capability of the recording device 1, a distance-measuring image can be generated with enhanced resolution.

Figure 10:
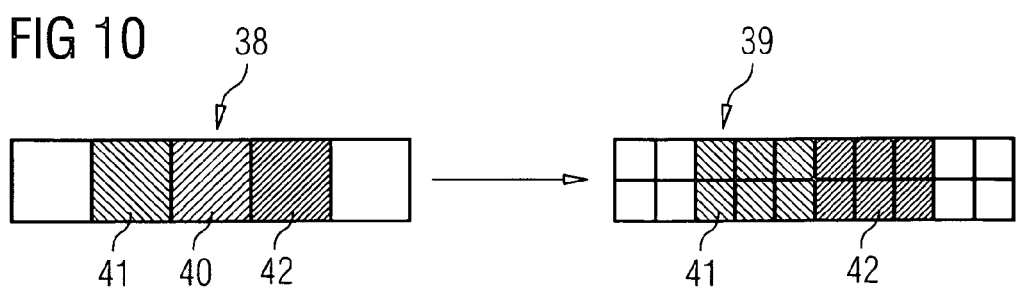
FIG. 10 shows a representation of the use of the additional distance information for enhancing the resolution.

If the scene 30 to be investigated is unknown, the distance values of adjacent sensor elements 9 are employed for generating the enhanced-resolution distance-measuring image. In this way, in accordance with FIG. 10 a low-resolution distance-measuring image 38 can be converted into an enhanced-resolution distance-measuring image 39, whereby image elements 40 which reproduce multiple targets with multiple object layers and to which no unique distance value can therefore be assigned are subdivided and the partial areas are assigned corresponding distance values by adjacent image elements 41.

In a modified embodiment, the distance-measuring image is generated through adaptation to the known model. This is particularly advantageous for monitoring tasks where known moving objects are to be detected in three-dimensional space and the objects to be detected are partially concealed by other structures. The objects to be monitored can be detected by the multi-target-capable recording device 1 despite being partially concealed. This is because, using model knowledge, the distance value from the actual object can be assigned to an image element.

Monitoring tasks of this type include, for example, the recognition, counting and tracking of persons and vehicles. Railway platform monitoring can also constitute a monitoring task of this type.

The invention claimed is:

1. A device for recording distance-measuring images, comprising:

a light source to emit light pulses;

a photodetector to integrate a light stream of a light pulse, wherein the light stream is reflected on an object region via a time window whose time interval is variable in relation to the process of emission of the light pulse, into a multiplicity of light quantity values; and an evaluation unit to determine a distance to the object region based upon a correlation function formed by the light quantity values, wherein the evaluation unit determines extreme values of a gradient of the correlation function and determines therefrom the distances of differently distant object regions, wherein the evaluation unit determines the position of the extreme values of the gradient based upon a difference function of the correlation function, and wherein the difference function contains the differences between a determined value of the correlation function and an adjacent value of the correlation function.

2. The device as claimed in claim 1, wherein the evaluation unit is connected downstream of the photodetector.

3. The device as claimed in claim 1, wherein a duration of the emitted light pulses is less than or equal to the time which light needs for covering a distance difference to be resolved.

4. The device as claimed in claim 1, wherein the time interval between the process of emission of the light pulse and the time window are varied by time spans which are less than the half-amplitude duration of the emitted light pulse.

5. The device as claimed in claim 1, wherein the time interval between the determined value and the adjacent value of the correlation function is less than double the half-amplitude duration of the emitted light pulses.

6. The device as claimed in claim 1, wherein the time interval between the determined value and the adjacent value of the correlation function is greater than or equal to half the half-amplitude duration of the emitted light pulses.

7. The device as claimed in claim 1, wherein the device has an intermediate memory to file the values of the correlation function for processing by the evaluation unit.

8. The device as claimed in claim 1, wherein pairs of adjacent sensor elements respectively have offset time windows, and wherein a difference-forming unit connected downstream determines the values of the difference function.

9. The device as claimed in claim 1, wherein the emitted light pulses and the reflected light pulses respectively pass through a protective surface arranged in front of the light source, and in front of the photodetector, wherein the evaluation unit monitors for interfering reflective objects.

10. The device as claimed in claim 1, wherein the evaluation unit generates a distance-measuring image with enhanced resolution, wherein the evaluation unit subdivides image elements which map a plurality of differently distant object regions and assigns the partial areas to the adjacent image elements according to their distance values.

11. The device as claimed in claim 1, wherein the evaluation unit generates a distance-measuring image with enhanced resolution, wherein the evaluation unit adapts the distance-measuring image to a model of a previously known object region.

12. The method as claimed in claim 1, wherein the correlation function is determined by the light-propagation-time-measuring device based upon a short-term integration.

13. The method as claimed in claim 12, wherein partially concealed objects are detected.

14. A method for recording distance-measuring images, comprising:

determining a correlation function between light pulses reflected on an object region and a time window of a light-propagation-time-measuring device; and determining the distances of differently distant object regions based upon extreme values of a gradient of the correlation function, wherein the extreme values of the gradient of the correlation function are determined based upon extreme values of a difference function derived from the correlation function, and wherein the difference function contains the differences between a determined value of the correlation function and an adjacent value of the correlation function.

15. The method as claimed in claim 14, wherein partially concealed objects are detected.

* * * * *